FIG. 1

April 26, 1960   A. V. T. DAY   2,933,813
ELLIPSOGRAPHS
Filed Feb. 16, 1953   5 Sheets-Sheet 2

INVENTOR.
Albert V T Day

FIG. 4

April 26, 1960     A. V. T. DAY     2,933,813
ELLIPSOGRAPHS Filed Feb. 16, 1953     5 Sheets-Sheet 4

INVENTOR.
Albert V T Day

INVENTOR.
Albert V T Day

United States Patent Office 2,933,813
Patented Apr. 26, 1960

2,933,813

ELLIPSOGRAPHS

Albert V. T. Day, Greens Farms, Conn.

Application February 16, 1953, Serial No. 337,183

12 Claims. (Cl. 33—23)

The purpose of this invention is to draw, with precision and facility, an ellipse or elliptic arc having any desired ratio of major and minor axes up to infinity; and conveniently to locate that ellipse or arc at any place on the drawing board, and with any directional disposition of its axes. A circle constitutes a special case of ellipse whose two foci are brought into coincidence so that the ratio of its X and Y axes is unity. Accordingly, in this specification, the general term ellipse or elliptic arc will include such a circular ellipse or its segment. The device will describe any complete ellipse lying within its spatial limitations, or any partial elliptic arc lying within those limitations, regardless of the magnitude of its ideal elliptical completion. The instrument should be particularly useful in drawing elliptical projections of geodetic circles in cartography.

Figure 1:
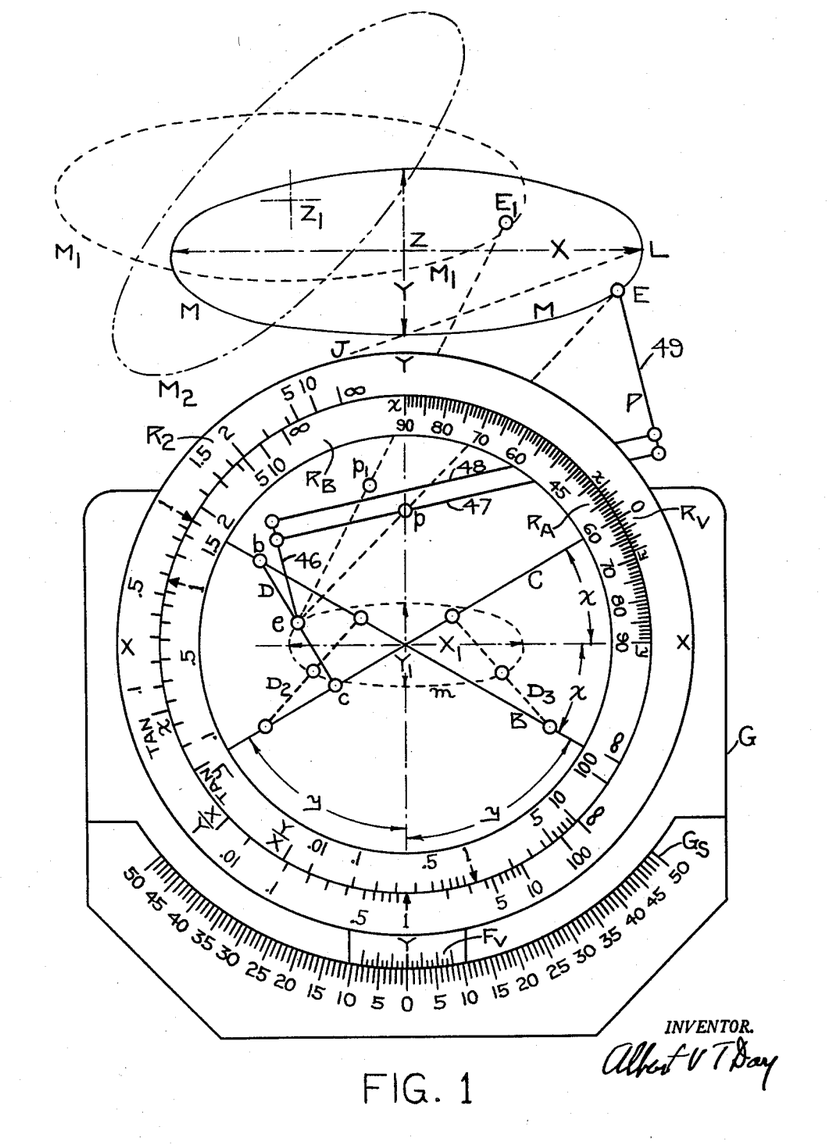
Figure 1 is a schematic plane of the cardinal elements of the ellipsograph and its adjustment scales, excepting the yoke-scale $d$ on the disc 35 of Figures 4–9A.

The coacting parts of Figure 1 are devised for most convenient schematic representation, and therefore do not exactly duplicate the forms of corresponding parts in the structural drawings. A T-shaped orienting-plate F (Figs. 4, 5) is swiveled on the main bed-plate G by a pivot 24 at the intersection of the T-arms and T-stem. The T-stem terminates in a vernier-block $F_V$ coordinated with a scale $G_S$ marked on the main bed-plate and calibrated in degrees to indicate the clockwise or counter clockwise deflection of the orienting plate. The termini of the T-arms carry upright posts 25 and 40, which in turn support the upper and lower bearing-rings $R_2$ and $R_3$, which are concentric with each other and the orienting pivot 24. An upper rotor-ring $R_B$ turns in the upper bearing-ring $R_2$, and carries a diametric slider-guide having a guide-slot B. A lower rotor-ring $R_C$ likewise turns in the lower bearing-ring $R_3$, and carries a similar complementary diametric guide-slot C. In the schematic Figure 1, these guide-slots are represented by the simple diametric lines B and C. The bearing-rings $R_2$ and $R_3$ are disposed in fixed relation to the coordinate X-axis and Y-axis which turn with the orienting T-plate F about its pivot 24. In the schematic Figure 1, the X-axis is the diametric line between the letters X, X, marked on opposite sides of the bearing-ring $R_2$; while the Y-axis is the diametric line connecting the letter Y marked on that bearing-ring, and the opposite letter Y marked on the vernier $F_V$ of the orienting-plate F. In the structural Figure 4, the X-axis is the diametric line between the opposite letters X, X, marked on the bearing-ring $R_2$, while the Y-axis likewise joins the opposite letters Y, Y, marked on that bearing-ring.

Figure 5:
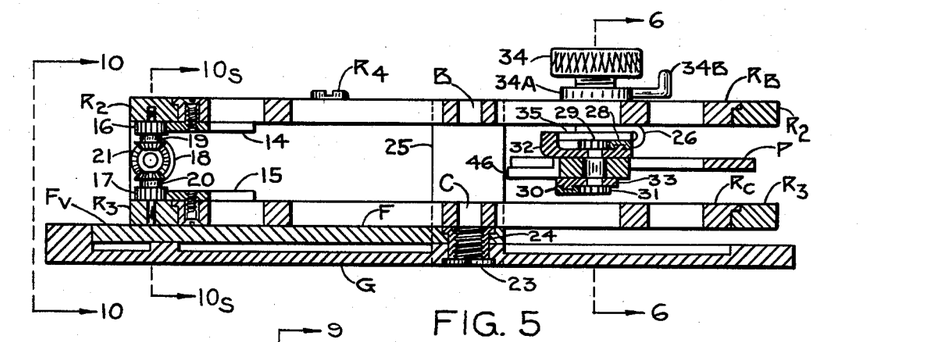
Figure 5 is an elevation section on the plane 5—5 of Figures 4 and 10.
Figure 6:
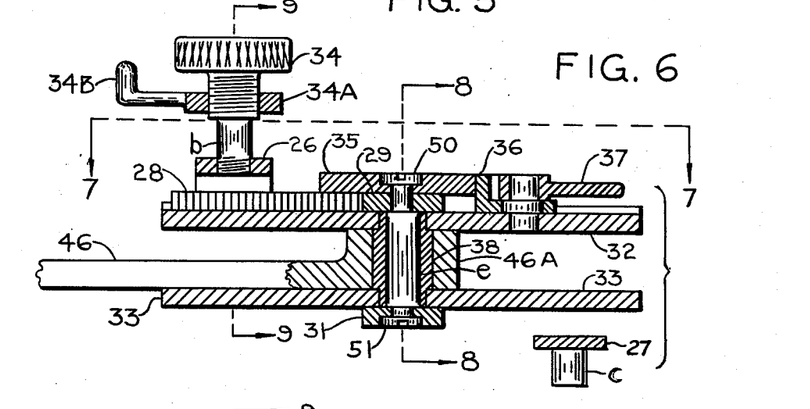
Figure 6 is an enlarged detail elevation of the yoke-mechanism on the plane 6—6 of Figures 5, 7, 9. In this Figure 6, the slider $c$ and its carrying bracket 27 appear to be floating without support, because the gear-rack 30 which carries that bracket is located on the viewer's side of the section plane, as indicated most clearly by the plane-index 6—6 of Figure 9.
Figure 7:
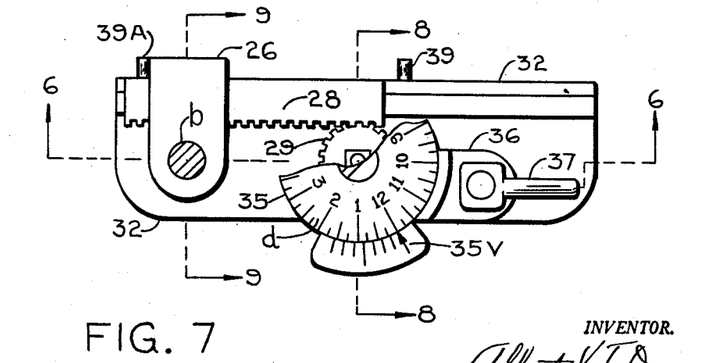
Figure 7 is a partly sectional enlarged detail plan of that yoke-mechanism as seen through the view-plane 7—7 of Figure 6.
Figure 8:
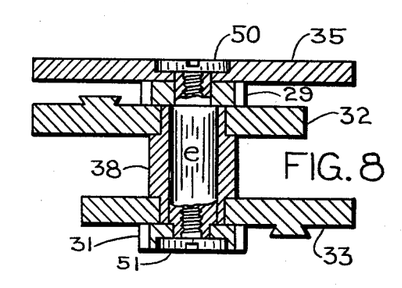
Figure 8 is an enlarged elevation of the yoke-mechanism sectioned on the plane 8—8 of Figure 7, showing the scale-disc 35 and rack-operating gears 29, 31, but omitting the racks 28 and 30.
Figure 10:
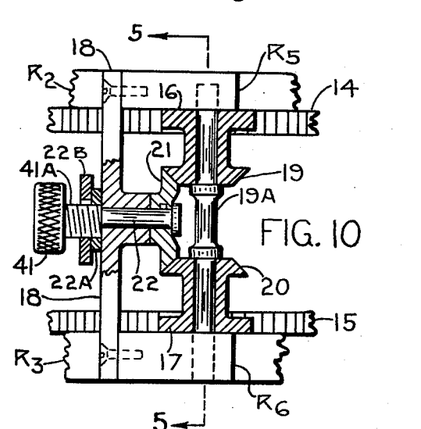
Figure 10 is an enlarged partly sectional elevation seen through the view-plane 10—10, and section-plane $10_S$—$10_S$, of Figure 5, and showing the gears which adjust and lock the guide-angles $x$ and $y$ of Figure 1.

The complementary rotor-rings $R_B$ and $R_C$ are geared together so they must turn equally in opposite directions relative to their bearing-rings and the ellipsograph axes X—X and Y—Y marked thereon. Figures 5 and 10 show how this is accomplished by the arcuate gear-racks 14 and 15 mounted on those rotor-rings $R_B$ and $R_C$, and turned oppositely by spur gears 16 and 17 oppositely rotated by the intermediate miter gear 21. The gears 16, 19, 20, 17, turn on the stationary shaft 19A mounted in the bearing-rings $R_2$ and $R_3$; the gear 21 is fixed on the shaft 22 turning in the frame 18 also mounted on those bearing-rings; and all those gears are turned by a manual knurl-knob 41 fixed on that shaft 22. This gear system is either locked, or released for turning, by a manual lock-disc 22B threaded on the hub 41A integral with the shaft 22 and knob 41. The ideal cylindrical surface of that hub is flattened at the point 41A, and carries a friction washer 22A with a smooth bore and an internal flat engaging the hub-flat 41A, so that the washer can slide longitudinally on that hub, but cannot turn relative to it. The manual lock-disc 22B can be turned on its thread to force the friction washer 22A against the frame 18, to lock the shaft 22 against turning. When that lock is released, the entire gear system and the knob 41 will spin freely in response to a turning effort manually imparted to the rotor-rings $R_B$ and $R_C$. Thus any desired angular relation of those rotor-rings and their guide-slots B and C can be quickly approximated, after which the manual knob 41 can be turned to effect their exact required angles, variously indicated by the coacting scales on the upper bearing-ring $R_2$ and upper rotor-ring $R_B$. Then the system will be locked by the lock 22A, 22B, or any other suitable means. Each rotor-ring turns 90 degrees, and their midway positions place the guides B and C normal to each other and at 45 degrees to the bearing-ring diameters X—X and Y—Y. Consequently, as those guides are turned equally in opposite directions, their relative angles are always bisected by those ring diameters, so that the diameter X—X always makes equal guide-angles $x$ with both guides B and C, while the diameter Y—Y always makes equal guide-angles $y$, with both those guides, and those guide-angles $x$ and $y$ are always complementary.

Upper and lower sliders $b$ and $c$ slide in the guide-slots B and C of the upper and lower rotor-rings $R_B$ and $R_C$ (Figs. 1, 6, 7, 9). Those sliders $b$ and $c$ are connected by an adjustable yoke-mechanism which varies the horizontal or virtual component D of the distance between them, while carrying the arc-describing member $e$ always at the middle of that virtual distance. In the schematic Figure 1, that entire yoke-mechanism, or slider-yoke, is symbolized by the simple line D connecting its sliders $b$ and $c$; while that line D also represents the said virtual distance between those sliders; and the lines $D_2$ and $D_3$ represent successive positions of that slider-yoke in the process of carrying its arc-describing member $e$ through the path of the parent (or primary) ellipse $m$. Those sliders $b$ and $c$ move in the separated horizontal planes of their respective guides B and C, while the arc-describing member $e$ moves in the intermediate horizontal plane, so that their connecting adjustable yoke-mechanism can vary that virtual yoke-distance D from its maximum down to the zero distance which poses those sliders, and the arc-describing member, all in vertical alignment. Figures 5 to 9A show how that result is attained by mounting the upper and lower sliders $b$ and $c$ respectively on brackets 26 and 27 carried by upper and lower gear-racks 28 and 30 sliding on guides 32 and 33 rigidly joined by a bushing 38 surrounding the pivot-shaft $e$. Those gear-racks 28 and 30 are moved in opposite directions by gears 29 and 31 secured to opposite ends of that pivot-shaft $e$, which is turned by a manually operated yoke-disc 35 carrying an arcuate yoke-scale $d$ coacting with a vernier 35V mounted on the guide 32. The yoke-disc 35 will be secured in any desired angular position by a locking shoe 36 operated by a manual lever 37, in a well known manner. When the yoke-disc 35 is unlocked, its gears 29 and 31 will spin freely in response to a manual push imparted to either or both gear-racks 28, 30. Thus any desired setting of the disc 35 can be quickly approximated, after which it can be set exactly by its vernier 35V, and then locked. As the gear-racks 28 and 30 carry their slider-brackets toward the yoke center, the upper slider-bracket 26 passes freely over the yoke-disc 35, while the lower slider-bracket 27 passes freely under the gear 31.

Figure 9:
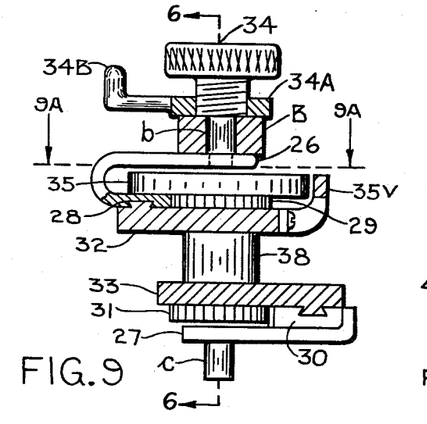
Figure 9 is an enlarged sectional elevation of the yoke-mechanism on the plane 9—9 of Figures 6, 7, 9A, but omitting the pantograph arm 46 and its terminal boss 46A, and omitting the walls of the guide-slot C which guides the lower slider $c$ lying beyond the said section-plane 9—9.
Figure 9A:
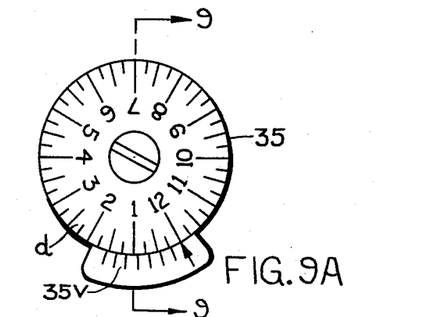
Figure 9A is an enlarged plan of the yoke-disc 35 and vernier 35V of Figures 4 to 9.

Figure 9 shows the upper slider $b$ in its guide-slot B carried by the upper rotor-ring $R_B$, and shows the lower slider $c$ without its guide-slot, which is omitted. The upper slider $b$ is rigidly mounted on the slider-bracket 26, and a hand-knob 34 is rigidly mounted on that slider. A lock-ring 34A is threaded on the hub of that hand-knob, and carries a wing 34B manually operated to lock the slider $b$ in its guide-slot, by clamping the walls of that slot between that lock-ring 34A and the slider-bracket 26. When that slider-lock 34A is released by manipulating its wing 34B, both sliders are free to slide in their guide-slots.

The hand-knob 34 imparts to the yoke-mechanism D, a combined turning-and-sliding impulse which impels that yoke and its sliders through a complete cycle, including its successive positions indicated in Figure 1 at D, $D_2$, $D_3$. The arc-describing member $e$ consequently describes the parent or primary ellipse $m$ whose axes $X_1$ and $Y_1$ are always parallel respectively with the ellipsograph axes X—X and Y—Y which turn with the orienting plate F. That arc-describing member $e$ turns in its bearing-bushing 38, which swivels in the boss 46A formed on the end of the short pantograph-arm 46. That swivel, 38—46A, constitutes the directive point of the pantograph. Thus the arc-describing member $e$ moves that short arm of the pantograph P whose anchor-pivot is $p$, and whose pencil-scriber E is secured at the homologous duplicating point of the pantograph, and consequently draws the magnified secondary ellipse M whose axes X and Y are parallel and proportionate with $X_1$ and $Y_1$. As referred to the ensuing equations, the yoke-scale $d$ is calibrated to indicate the product $d_S$ of the instant yoke-distance D and the ellipse-magnifying factor $P_M$. To condense the diagram, Figure 1 shows that magnifying factor $P_M$ of the pantograph, smaller than it would generally be made in practice. The pencil-scriber E projects downward from the pantograph arm 49, and slides on the drawing to support that arm at the proper elevation above the board. Likewise, a post or leg projects downward from the joint-pivot 47A, to slide on the drawing, and thus support the pantograph arm 47.

The instant values of the $x$ and $y$ guide-angles of the slider-guides B and C are shown by a common scale $R_A$ extending over one quadrant of the rotor-ring $R_B$ from $x$ to $y$, and read by a vernier $R_V$ on the bearing-ring $R_2$. The zero line on that vernier constitutes an index for reading that angle scale $R_A$, and points to 45 when $x=y=45$ degrees. That zero index, and the vernier scale extending counterclockwise therefrom, indicate the $x$-angle on the scale $R_A$ regarded as extending counterclockwise from zero at $y$ to 90 degrees at $x$. Likewise, that same zero index, and the vernier scale extending clockwise therefrom, indicate the $y$-angle on that same scale $R_A$ regarded as extending clockwise from zero at $x$ to 90 degrees at $y$. The actual numerical markings on the scale $R_A$ show the quantity of $x$ when it exceeds 45 degrees, and show the quantity of $y$ when it exceeds 45 degrees. Since $x$ and $y$ are always complementary, it is never necessary to read either angle when less than 45 degrees, because the reading can then be made for the complementary angle.

The bearing-ring $R_2$ and rotor-ring $R_B$ carry duplicate scales marked Tan $x$ and Tan $y$ which show respectively the tangent values of the complementary $x$ and $y$ angles indicated by any setting of the angle scale $R_A$. The unit mark on each tangent scale serves as the index for reading its opposite tangent scale, and these indexes are in mutual register when $x=y=45$ degrees. The $x$ and $y$ tangents thus simultaneously indicated are reciprocals.

The axes ratio $X_1/Y_1 = X/Y$ is determined by the relative values of the complementary guide-angles $x$ and $y$, in accord with the ensuing Equations H and I. And the rotor-rings $R_B$ and $R_C$ can be secured by their lock (22B) in any angular relation on their bearing-rings to maintain any values of those ratio-determining guide-angles $x$ and $y$, to render any ratio $X/Y$ of those ellipse axes. When $x=y=45$ degrees, the axes ratio $X/Y$ is unity, so that the resulting ellipse is circular. The bearing-ring $R_2$ and rotor-ring $R_B$ carry duplicate ratio scales marked $X/Y$ and $Y/X$ showing the simultaneous numerical values of axes-ratios which ensue from the $x$ and $y$ angles indicated by any setting of the angle scale $R_A$. The unit mark on each ratio scale serves as the index for reading its opposite ratio scale, and these indexes are in mutual register when $x=y=45$ degrees. When the index on the rotor-ring $R_B$ points to infinity on the $X/Y$ scale, then the index on the bearing-ring $R_2$ points to zero on the $Y/X$ scale; the $x$-angle is reduced to zero; the B and C guides are parallel with each other and with the X—X diameter of that bearing-ring $R_2$; and the arc-describing member $e$ and pantograph-scriber E consequently move parallel to that X—X diameter to describe the straight line representing an ellipse whose axes-ratio $X/Y$ is infinity, and whose axes-ratio $Y/X$ is zero. Reciprocally, when those indexes point to zero on the $X/Y$ scale and infinity on the $Y/X$ scale, then the $y$-angle is reduced to zero, and the scribers consequently move parallel to the Y—Y diameter of $R_2$ to describe the straight line representing an ellipse whose axes-ratio $X/Y$ is zero, and whose axes-ratio $Y/X$ is infinity. When the index on the rotor-ring $R_B$ points to any finite value of the $X/Y$ ratio, then the index on the bearing-ring $R_2$ points to the reciprocal value of the $Y/X$ ratio. Since the $X/Y$ and $Y/X$ scales are calibrated in decimal expressions of their indicated axes-ratios, any fractional expression of a given axes-ratio must be translated to its decimal form for proper reference to those scales. In accord with the ensuing Equations H and I, the numerical indications on the $X/Y$ and $Y/X$ scales equal the squares of the simultaneous indications on the Tan $y$ and Tan $x$ scales respectively.

When the $X/Y$ scale, or the $Y/X$ scale, has been set to render any required axes-ratio, then the axes lengths X and Y will depend on the yoke-distance D, and the consequent numerical indication (which may be designated $d_S$) on the yoke-scale $d$, and the simultaneous tangent values on the Tan $x$ and Tan $y$ scales, all in accord with the ensuing Equations A–D. Hence, the required quantity of X or Y will be rendered by setting that yoke-scale $d$ at its numerical indication $d_S$ required by Equation D. Thus any prescribed quantity of X is $y$ multiplied by the instant reading on the Tan $x$ scale, or is divided by the instant reading on the Tan $y$ scale, to reveal the $d_S$ setting necessary to describe an ellipse having that required X-axis, all as stated in Equation D. Likewise, any prescribed quantity of Y is multiplied by the instant reading on the Tan $y$ scale, or is divided by the Tan $x$ reading, to reveal the $d_S$ setting necessary to describe an ellipse having that required Y-axis, all as stated in Equation D. When the quantity $d_S$ thus indicated exceeds the maximum range of the yoke-scale $d$, then the required ellipse exceeds the space limits of the ellipsograph. But the machine will describe a middle portion of the elongate arc of an ellipse whose major axis has any magnitude up to infinity, providing its axes product XY in Equation E does not exceed the constant $(d_S)^2$ when $d_S$ is the maximum limit reading of the yoke-scale $d$. Hence, when the quantity of Y is prescribed, Equation F tells the maximum collateral quantity assignable to X within the space limits of the machine. Likewise, when X is prescribed, Equation G indicates the maximum quantity assignable to Y within those space limits.

Figure 4:
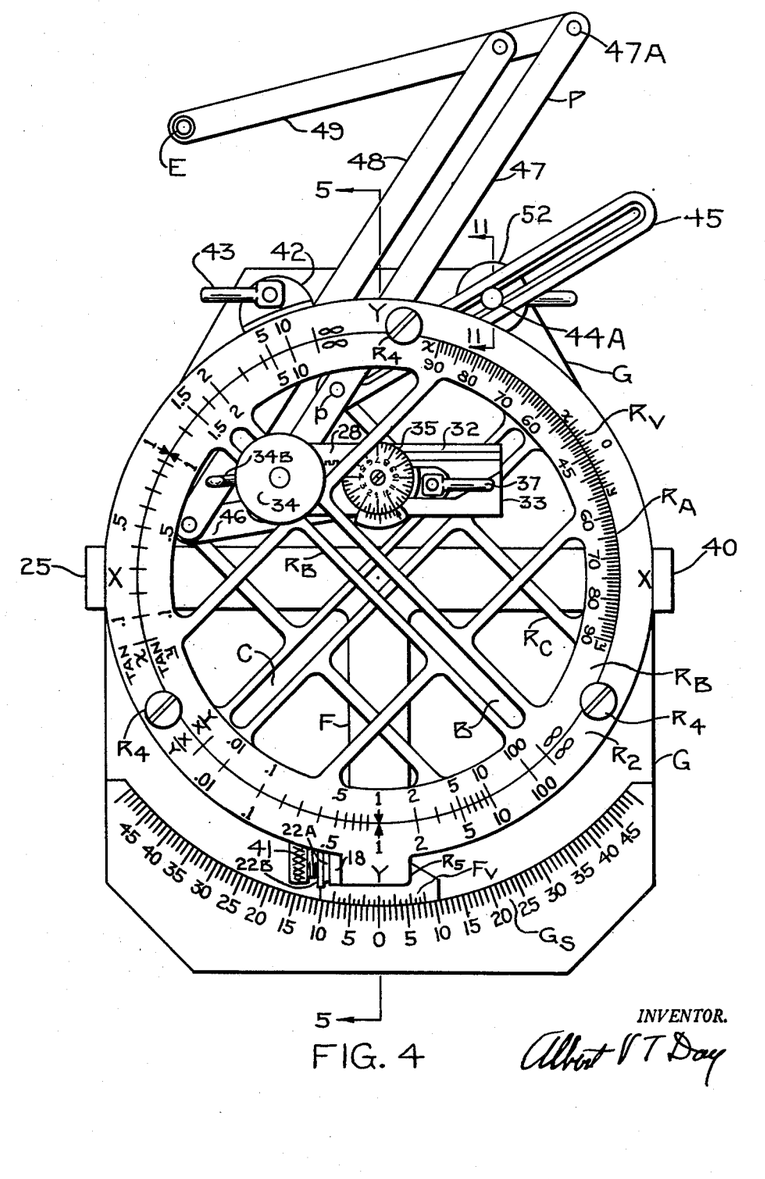
Figure 4 is a structural plan generally corresponding to the schematic Figure 1, but showing the guides B and C at right angles instead of oblique angles, and showing the slider-yoke 33 parallel to the X—X axis of the instrument, instead of being inclined to that axis.
Figure 11:
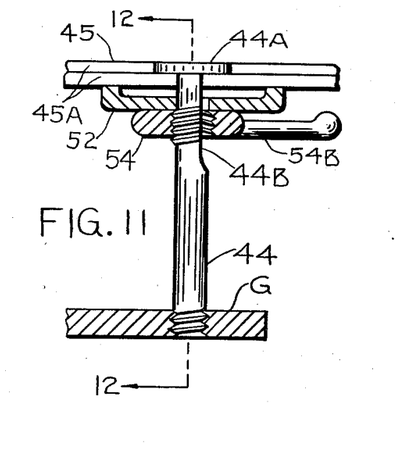
Figure 11 is an enlarged sectional elevation of the pantograph-lock taken in the plane 11—11 of Figures 4 and 12.
Figure 12:
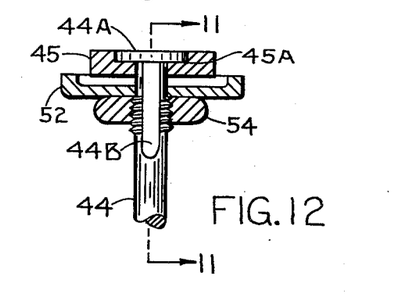
Figure 12 is a detail section on the plane 12—12 of Figure 11.

The pantograph anchor-pivot $p$ (Fig. 4) is connected with the main bed-plate G by an anchor-lock which conveniently locks that pivot in any position relative to that bed-plate, to facilitate disposition of the ellipse at any desired place on the drawing board. Figures 4 and 11 show one way of accomplishing that result. A stud 44 is screwed into the bed-plate G, and threaded to receive the locking-ring 54 which has a manual wing 54B. A flat 44B is cut on that stud, and a friction-disc 52 lies upon that locking-ring, and fits the stud and its flat so it can slide on the stud longitudinally, but cannot turn thereon. An anchor-link 45 with a slot 45A is swiveled on the anchor-pivot $p$, and lies on the friction-disc 52. The stud 44 passes through the link-slot 45A, and terminates in a flat round head 44A fitting that slot, and thus retaining the anchor-link 45 upon that friction-disc. When the locking-ring 54 is screwed upward, it clamps the anchor-link between the friction-disc 52 and stud-head 44A, to lock it in fixed position on the stud 44. When that locking-ring is loosened the anchor-link 45 will slide and turn freely on the stud 44 to dispose the pantograph anchor-pivot $p$ in any desired position where it can then be locked again. That use of the pantograph anchor-lock can be exemplified as follows: Assume that the instrument has described the ellipse M of Figure 1; the pantograph-scriber is stopped at E; and it is now required to draw a parallel duplicate ellipse $M_1$, whose point $E_1$ shall correspond with E. First, apply the slider-lock 34A to secure the slider-yoke D in its position shown in Figure 1. Next, release the anchor-lock by its lever 54B. Next, grasp the pantograph-scriber E and shift it to $E_1$, which will shift the pantograph anchor-pivot from $p$ to $p_1$, while the pantograph anchor-link 45 slides and turns freely on its stud 44. Thus the virtual pantograph arm is shifted from $epE$ to $ep_1E_1$. Next, relock the anchor-lock to secure its anchor-pivot at $p_1$. Next, release the slider-lock 34A, and manipulate the hand-knob 34 to describe the ellipse $M_1$ whose center is $Z_1$, and whose axes are parallel with X and Y of the ellipse M. Thus an ellipse can be centered at any required point throughout a wide range on the drawing board, without shifting the ellipsograph base.

As before explained, the rotor-rings $R_B$ and $R_C$ turn in their bearing-rings $R_2$ and $R_3$, which are mounted on the orienting-plate F, which is pivoted on the main bed-plate G concentrically with all those rings, so their centers are not displaced when that orienting-plate is turned. Hence, its turning rotates the diameters X—X and Y—Y of those bearing-rings, together with the accordant axes of the parent ellipse $m$ and its pantographed replica M, without displacing their centers on the drawing board. For instance, assume that ellipsograph setting which drew the ellipse $M_1$ centered at $Z_1$ in Figure 1. Now, if the orienting-plate F be rotated 45 degrees counterclockwise, an ensuing propulsion of the arc-describing member $e$ around the parent ellipse $m$ will cause the pantograph-scriber to describe the ellipse $M_2$ also centered at $Z_1$, with its axes turned 45 degrees counterclockwise relative to the axes of $M_1$. Any clockwise or counterclockwise rotation of the orienting-plate F likewise entails a corresponding angular displacement of the ellipse subsequently drawn by the pantograph-scriber. The angular quantity of any such clockwise or counterclockwise rotation is shown by the protractor scale $G_S$ marked on the bed-plate, and read by the vernier $F_V$ on the orienting-plate. Figure 4 shows a locking device 42, 43, mounted on the bed-plate G and pressing on the lower bearing-ring $R_3$, to secure both bearing-rings and the orienting-plate in any desired angular setting.

The rotation of the orienting-plate F can exceed 45 degrees in each direction from its middle position shown in Figures 1 and 4, and thus the X-axis of an ellipse such as $M_1$ can be given any inclination to the drawing-board-horizontal within that range of 90 degrees, while its Y-axis is given the same range of inclination to the drawing-board-vertical. Since the $X/Y$ and $Y/X$ ratio-scales can be set to constitute either X or Y as the major axis, an ellipse can be drawn with its major axis lying at any angle on the drawing board. Or, without manipulating the orienting-plate, the bed-plate G can be located on the drawing board at any place and angle necessary to produce any desired location and inclination of the ellipse to be described. That procedure will be facilitated by aligning one of the straightedges of the bed-plate G with a line or straightedge laid on the board at the required angle.

The nonuniform ratio scales ($X/Y$ and $Y/X$) and the nonuniform tangent scales (Tan $x$ and Tan $y$) can be manipulated with facility as before explained, to satisfy the accuracy requirements of ordinary practical use. But quantities to be interpolated between their nonuniform marks cannot be placed with such exactitude as may be desired in special cases. To attain such special accuracy, the exact required $x$ or $y$ angle can be computed from the exact required axes ratio in accord with the ensuing Equation J or K; and the rotor-ring $R_B$ can then be set for that exact angle by its uniform angle-scale $R_A$ read by the vernier $R_V$.

The entire transmission mechanism between the hand-knob 34 and pantograph-scriber E may impose a considerable resistance leverage when that scriber is required to describe a very large ellipse. To compensate that resistance, that scriber E can be dragged by a pull-string in the general direction of the ellipse tangent, while its exact direction will be guided by the ellipsograph mechanism thus impelled by the pull-string.

Figure 2:
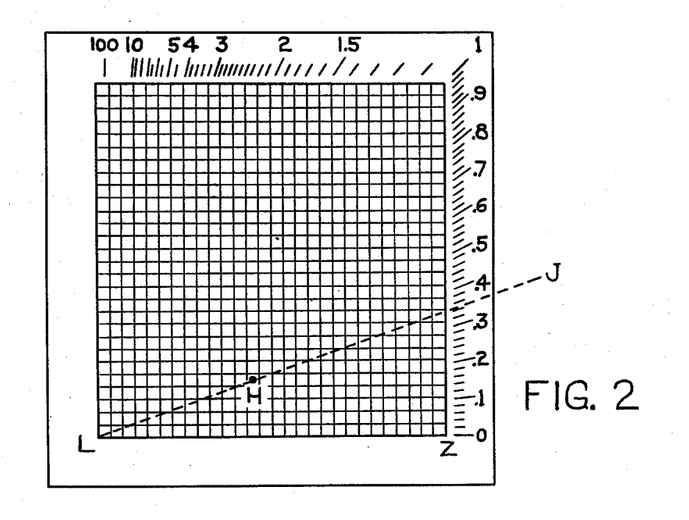
Figures 2 and 3 show ratiometer devices for conveniently ascertaining the numerical expression of the ratio of X and Y axes of a required ellipse.

Figure 2 shows a ratiometer chart to be printed on a suitable card of paper or plastic having a surface permitting repeated pencil markings and easy erasures without deterioration. Often the axes of a required ellipse will be indicated on the drawing board, with no arithmetic expression of their linear ratio. Then, in the absence of a ratiometer, the ellipsograph user must measure those axes with a linear scale, and compute the decimal expression of their ratio for setting the ratio scales. But that time-consuming procedure can be avoided by using a compass or dividers to transfer those axes-lengths directly to the ratiometer chart, to establish a reference dot H whose distances from the lower and leftward chart-edges are equal to the respective ellipse-axes. For instance, the vertical distance of the dot H from the chart reference line L—Z may equal either axis, while its horizontal distance from the leftward chart-edge will equal the other axis. Then an index line L—J drawn from the chart vertex L through that dot H will intersect the marginal ratio-scale at a point indicating the tangent of JLZ which is the ratio of that vertical distance to that horizontal distance. The vertical marginal scale indicates such axes-ratios from zero upward to unity, while the horizontal marginal scale indicates such ratios from unity leftward to infinity. When the said vertical chart-distance is less than its coordinate horizontal distance, then the index line will intersect the vertical scale, which can generally be read more easily than the horizontal scale. Hence it will generally be more facile to select the minor axis of the ellipse as the linear quantity of that vertical chart-distance. If either ellipse axis exceeds the dimensions of the chart, then their proportionate semiaxes, or quarter-axes, or smaller fractions, may be applied on the chart in the same manner to render the same ratio indication. On the other hand, if both ellipse axes are too small for convenient application to the chart, the draftsman's dividers can mark thereon any common multiple of those axes, to render the indication of their ratio. The indicated horizontal and vertical cross-lines on the chart will facilitate location of the reference dot H.

When a required ellipse M is indicated by its axes X and Y laid down on the drawing as in Figure 1, then any line L—J drawn through their termini will render the angle ZLJ whose tangent expresses their ratio. The ratiometer chart may be made of a suitable transparent material, and may be laid on the drawing so that the chart vertex L registers with the vertex L on the drawing; the chart reference line L—Z registers with the line L—Z on the drawing; and the line L—J on the drawing constitutes an index line L—J visible through the chart, and intersecting the chart scale at a point indicating the tangent of JLZ, which is the axes ratio of the required ellipse M.

Figure 3:
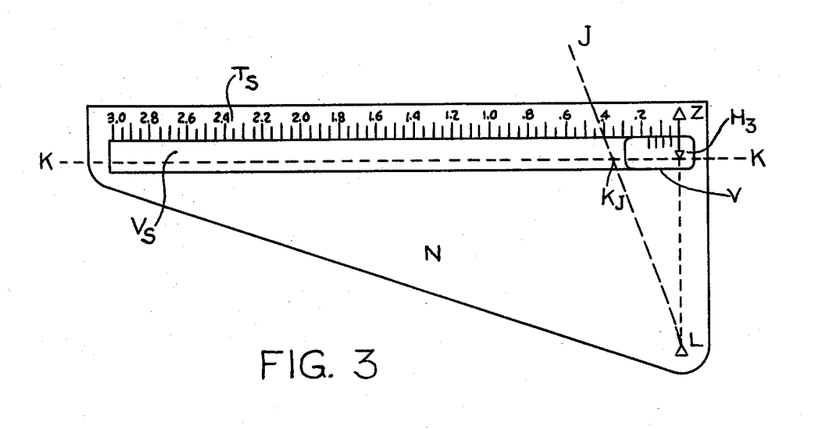

The ratiometer of Figure 3 consists in a triangular transparent plate N with a slot $V_S$ which guides a transparent vernier-slide V. The bottom surfaces of that plate and slide both lie flush on the surface of the drawing. Indexes L and Z are marked on the bottom surface of the plate N to define its reference line L—Z, while a tangent-index $H_3$ is marked on the bottom surface of the slide V. When that slide V occupies its most rightward position in the rightward end of its guide-slot $V_S$, then its index $H_3$ registers with the reference line L—Z, and the distance L—$H_3$ thus defined is taken as unity. When the slide V is moved leftward in its guide-slot $V_S$, its index $H_3$ describes the tangent line K—K, and the resulting distance of $H_3$ from that reference line L—Z is the tangent value of the resulting angle $H_3$LZ. That tangent-distance is measured by a tangent-scale $T_S$ marked on the upper surface of the plate N, and read by a vernier scale marked on the flush upper surface of the slide V. To ascertain the axes ratio of a required ellipse such as M in Figure 1, the transparent plate is laid on the drawing so that: the plate index L registers with the vertex L on the drawing; the plate reference line L—Z registers with the drawing line L—Z; and the drawing line L—J makes the visible angle JLZ beneath the plate. The transparent vernier-slide V is then moved until its index $H_3$ intersects that drawing line L—J at KJ, whereupon a vernier reading of the tangent-scale $T_S$ renders an accurate decimal expression of the tangent of that angle JLZ, which tangent equals the axes-ratio Y/X of the required ellipse M. All scales in the foregoing drawings are pictorial schematic representations, with no attempt at precision. For instance, the four scales marked X/Y, Y/X, Tan x, Tan y, are schematic skeleton scales indicating only their cardinal divisions.

The practical design of the instrument and its scales will be facilitated by its ensuing equations, wherein:

$P_M$ is the ellipse-magnifying factor of the pantograph P;
$D_M$ is the maximum horizontal distance between the sliders b and c;
D is any instant quantity of that distance $D_M$;
$d_S$ is the simultaneous numerical indication of the yoke-scale d;
$X_1$ and $Y_1$ are the respective simultaneous lengths of the $X_1$-axis and $Y_1$-axis of the parent ellipse m described by the arc-describing member;
X and Y are the respective simultaneous lengths of the corresponding X-axis and Y-axis of the magnified ellipse M described by the pantograph-scriber E;
x is the guide-angle made by the slider-guides B and C with the said $X_1$-axis and X-axis;
y is the simultaneous complementary guide-angle made by those slider-guides with the said $Y_1$-axis and Y-axis;
$Y_0$ represents the quantity of any given ordinate of any ellipse described by the ellipsograph, as evaluated in Equation L in terms of its simultaneous abscissa $X_A$ and guide angle y;
$X_A$ represents the quantity of any given abscissa of any ellipse described by the ellipsograph, as evaluated in Equation M in terms of its simultaneous ordinate $Y_0$ and guide angle y.

(A) $$d_S = DP_M$$

(B) $$X = DP_M \cot x = d_S \cot x = d_S \tan y = \frac{d_S}{\tan x}$$

(C) $$Y = DP_M \cot y = d_S \cot y = d_S \tan x = \frac{d_S}{\tan y}$$

(D) $$d_S = X \tan x = Y \tan y = \frac{X}{\tan y} = \frac{Y}{\tan x}$$

(E) $$XY = d_S^2$$

(F) $$X = \frac{d_S^2}{Y}$$

(G) $$Y = \frac{d_S^2}{X}$$

(H) $$\frac{X}{Y} = \frac{X_1}{Y_1} = \cot^2 x = \tan^2 y$$

(I) $$\frac{Y}{X} = \frac{Y_1}{X_1} = \cot^2 y = \tan^2 x$$

(J) $$\tan x = \sqrt{\frac{Y}{X}}$$

(K) $$\tan y = \sqrt{\frac{X}{Y}}$$

(L) $$X_A = (\tan^2 y) \sqrt{\left(\frac{Y_1}{2}\right)^2 - (Y_0)^2}$$

(M) $$X_A = (\tan^2 y) \sqrt{\left(\frac{Y}{2}\right)^2 - (Y_0)^2}$$

Equation L is a Cartesian definition of the complete locus m of the primary arc describer e referred to the X and Y axes of the machine, and determined by the y-angle of its guides B and C. And geometers will discern that Equation L also defines an ellipse. Hence, that arc describer e describes an ellipse m. And it will be further noted that the factor $(\tan^2 y)$ becomes unity and thus disappears from Equation L when its ratio-determining angle y is adjusted to 45 degrees to generate a circle. And accordantly, that Equation L presents a Cartesian definition of a circle (or circular ellipse) when its said factor ($\tan^2 y$) is thus eliminated. Thus Equation L expresses the parent ellipse $m$ (or the parent circle) which is described by the primary arc describer $e$, while the nearly identical Equation M describes the magnified elipse M (or circle) simultaneously traced by the pantograph stylus E, and having its coordinates all proportional to the homologous coordinates of the said parent ellipse $m$. And that magnification equals the ratio of the ellipse axis Y in Equation M to the homologous axis $Y_1$ in Equation L, which axis-ratio is denoted by the symbol $P_M$ in Equations A, B, C.

In its broadest purpose, the invention consists in a machine for moving any mechanical element (exemplified in $e$) through an ellipitcal path (exemplified in $m$) and for varying the axes ratio of the ellipse thus generated, regardless of the use to which that elliptical movement is applied, whether to communicate movement to a marking stylus (exemplified in E) or for any other purpose whatsoever. It is for this reason that the marking pantograph P is omitted from some of the following claims.

In the terminology of the ensuing claims: The "bearing member" is exemplified in the assemblage of the upper and lower bearing-rings $R_2$ and $R_3$. Each of the rotor-rings $R_B$ and $R_C$ with its guide slot B or C is a specific example of a "guide." Each of the sliders $b$ and $c$ is a specific example of a "traveler."

I claim as my invention:

1. An ellipsograph comprising: Two rectilinear crossed guides; a traveler directed by each guide; a yoke joining those travelers; an arc-describing member connected to that yoke midway between its said travelers; and means for varying the axes ratio of the elliptical arc described by that arc-describing member, said ratio-varying means including an angle-varying means for adjusting the angle of the crossed guides relative to each other.

2. An ellipsograph comprising: Two rectilinear crossed guides; a traveler directed by each guide; a yoke joining those travelers; an arc-describing member connected to that yoke midway between its said travelers; means for varying the angle of the crossed guides relative to each other; and a scale adapted to render an indication varying with that variable guide-angle, and calibrated to indicate the different axes ratios of ellipses generated by different values of that guide-angle.

3. An ellipsograph comprising: Two rectilinear crossed guides making four equal guide-angles $x$ with the X-axis of an ellipse to be described, and likewise making four equal guide-angles $y$ with the Y-axis of that ellipse; means for turning those guides simultaneously and equally in opposite rotary directions to oppositely vary their said $x$ and $y$ guide-angles while maintaining the said equality of those $x$ angles, and the said equality of those $y$ angles; a traveler directed by each guide; a yoke joining those travelers; and an arc-describing member connected to that yoke midway between its travelers.

4. An ellipsograph comprising: Two rectilinear crossed guides making four equal guide-angles $x$ with the X-axis of an ellipse to be described, and likewise making four equal guide-angles $y$ with the Y-axis of that ellipse, said $y$-angles being complementary to said $x$-angles; means for turning those guides simultaneously and equally in opposite rotary directions to oppositely vary their said complementary $x$ and $y$ guide-angles, while maintaining the said equality of those $x$-angles and the said equality of those $y$-angles; a traveler directed by each guide; a yoke joining those travelers; an ellipse-describing member connected to that yoke midway between its travelers; and a scale adapted to render an indication varying with the variations of those $x$ and $y$ guide-angles, and calibrated to indicate the different axes ratios of different ellipses described by the ellipse-describing member as determined by different quantities of the said guide angles.

5. An ellipsograph comprising: Two rectilinear crossed guides; means for varying the angle of those crossed guides relative to each other; a traveler directed by each guide; a yoke joining those travelers; an arc-describing member connected to that yoke midway between its said travelers; and means for moving those travelers simultaneously and equally in opposite directions along that yoke, toward and from that arc-describing member to maintain its midway position between the travelers.

6. An ellipsograph comprising: Two rectilinear crossed guides; means for varying the angle of those crossed guides relative to each other; a traveler directed by each guide; a yoke joining those travelers; an arc-describing member connected to that yoke midway between its said travelers; means for moving those travelers simultaneously and equally in opposite directions along that yoke, toward and from that arc-describing member to maintain its midway position between the travelers; and a scale coordinated with those travelers and calibrated to render readings varying with their linear separation on the yoke.

7. An ellipsograph comprising: Two rectilinear crossed guides; a traveler directed by each guide; a yoke joining those travelers; an arc-describing member connected to that yoke midway between its said travelers; means for varying the angle of the crossed guides relative to each other; means for moving the travelers simultaneously and equally in opposite directions along their said yoke, toward and from the said arc-describing member to maintain its midway position between those travelers while varying their distance from each other; a marking device and means connecting it with the arc-describing member; a scale adapted to vary with the angle between the guides; and a yoke scale adapted to vary with the distance between the travelers; said scales having their simultaneous readings calibrated to express coordinated factors jointly indicating the length of an axis of the ellipse to be described by the marking device as predetermined by the simultaneous guide-angle and traveler distance.

8. An ellipsograph comprising: Two rectilinear crossed guides; a traveler directed by each guide; a yoke joining those travelers; an arc-describing member connected to that yoke midway between its said travelers; means for varying the angle of the crossed guides relative to each other; means for moving the travelers simultaneously and equally in opposite directions along their said yoke, toward and from the said arc-describing member to maintain its midway position between those travelers while varying their distance from each other; a pantograph directed by the arc-describing member and carrying a marking device; a scale adapted to vary with the angle between the guides; and a yoke scale adapted to vary with the distance between the travelers; said scales having their simultaneous readings calibrated to express coordinated factors jointly indicating the length of an axis of the ellipse to be described by the pantograph marking member as predetermined by the simultaneous guide-angle and traveler distance.

9. An ellipsograph comprising: Two rectilinear crossed guides; a traveler directed by each guide; a yoke joining those travelers; an arc-describing member connected to that yoke midway between its said travelers; means for varying the angle of the crossed guides relative to each other; means for moving the travelers simultaneously and equally in opposite directions along their said yoke, toward and from the said arc-describing member to maintain its midway position between those travelers while varying their distance from each other; a scale adapted to vary with the angle between the guides; and a yoke scale adapted to vary with the distance between the travelers; said scales having their simultaneous readings calibrated to express coordinated factors jointly indicating a quantity proportionate to the length of an axis of the ellipse to be described by the arc-describing member as predetermined by the simultaneous guide-angle and traveler distance.

10. An ellipsograph comprising: Two rectilinear crossed guides; a traveler directed by each guide; a yoke joining those travelers; an arc-describing member connected to that yoke midway between its said travelers; a pantograph actuated by that arc-describing member, and having a marking stylus; and means for varying the axes ratio of the elliptical arc described by that arc-describing member, said ratio-varying means including an angle-varying means for adjusting the angle of the crossed guides relative to each other.

11. An ellipsograph comprising: Two rectilinear crossed guides making four equal guide-angles $x$ with the X-axis of an ellipse to be described, and likewise making four equal guide-angles $y$ with the Y-axis of that ellipse, said $y$-angles being complementary to said $x$-angles; means for turning those guides simultaneously and equally in opposite rotary directions to oppositely vary their said complementary $x$ and $y$ guide-angles, while maintaining the said equality of those $x$-angles and the said equality of those $y$-angles; a traveler directed by each guide; a yoke joining those travelers; an ellipse-describing member connected to that yoke midway between its travelers; and a scale arrangement showing the changing values of the $x$-angle throughout half of its variation range, and showing the changing values of its complementary $y$-angle while the $x$-angle is varied throughout the other half of its variation range.

12. An ellipsograph comprising: a base; a bearing member swiveled on that base; two rectilinear crossed guides swiveled on that bearing member, and making four equal guide-angles $x$ relative to an X-axis which is fixed relative to that bearing member, and likewise making four equal guide-angles $y$ relative to a Y-axis which is fixed relative to that bearing member, said $y$-angles being complementary to said $x$-angles; means for turning the guides simultaneously and equally in opposite directions on the bearing member to oppositely vary their said complementary $x$ and $y$ guide-angles, while maintaining the said equality of those $x$-angles and the said equality of those $y$-angles; a traveler directed by each guide; a yoke joining those travelers; and an ellipse-describing member connected to that yoke midway between its travelers.

References Cited in the file of this patent
UNITED STATES PATENTS

| | | |
|---|---|---|
| 184,493 | Anderson | Nov. 21, 1876 |
| 222,798 | Schnoor | Dec. 23, 1879 |
| 503,934 | Braastad | Aug. 22, 1893 |
| 910,129 | Hanson | Jan. 19, 1909 |
| 1,299,006 | Muller | Apr. 1, 1919 |
| 1,837,912 | Mann | Dec. 22, 1931 |
| 2,421,813 | Staghezza | June 10, 1947 |
| 2,458,208 | Ruger | Jan. 4, 1949 |
| 2,504,832 | Groome | Apr. 18, 1950 |
| 2,512,786 | Borg | June 27, 1950 |

FOREIGN PATENTS

| | | |
|---|---|---|
| 396,658 | France | Feb. 1, 1909 |
| 170,790 | Switzerland | Oct. 1, 1934 |
| 281,463 | Switzerland | June 16, 1952 |